United States Patent [19]
Gardner et al.

[11] 4,073,409
[45] Feb. 14, 1978

[54] HOT MELT DISPENSER WITH REMOVEABLE PUMP IN FOLLOWER

[75] Inventors: James J. Gardner; Hugh Paul Koppehele, both of Hamilton, Ohio

[73] Assignee: Fluid Kinetics, Inc., Fairfield, Ohio

[21] Appl. No.: 758,571

[22] Filed: Jan. 12, 1977

[51] Int. Cl.² .............................................. B67D 5/62
[52] U.S. Cl. ............................. 222/146 HE; 222/260
[58] Field of Search .............. 222/146 R, 146 H, 260, 222/261, 262; 219/421, 457, 467, 542, 536

[56] References Cited

U.S. PATENT DOCUMENTS

| 2,925,941 | 2/1960 | Bloxom | 222/261 X |
| 3,031,106 | 4/1962 | Hooker | 222/146 H |
| 3,282,469 | 11/1966 | Skonberg | 222/146 HE |
| 3,412,903 | 11/1968 | Van Riper, Jr. et al. | 222/146 HE |

Primary Examiner—Robert B. Reeves
Assistant Examiner—David A. Scherbel
Attorney, Agent, or Firm—Biebel, French & Nauman

[57] ABSTRACT

A dispenser, such as for a hot melt material, incorporates a platen which is movable into a container of material to be dispensed and incorporates a cartridge-type gear pump positioned centrally of the platen. The platen is carried on a support tube and the lower end of the support tube is provided with an opening through which the cartridge gear pump may be inserted or removed from the platen without the necessity of otherwise disturbing the platen.

7 Claims, 5 Drawing Figures

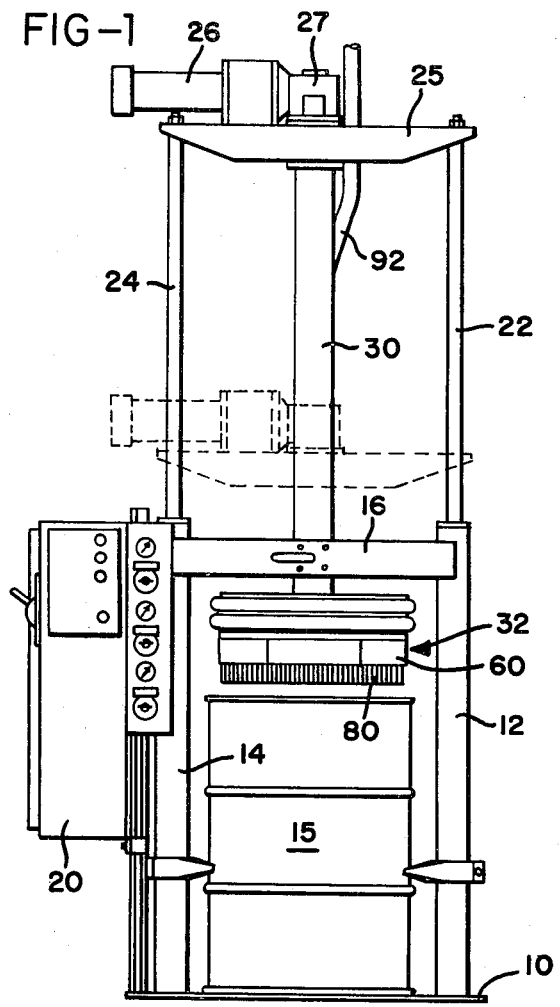
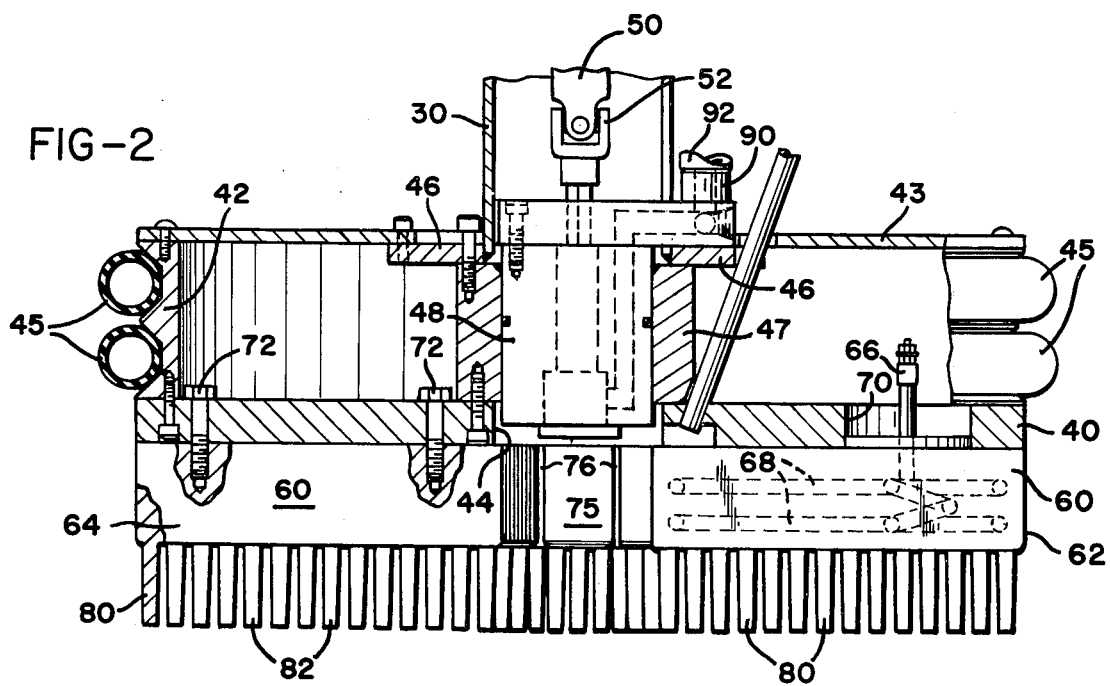

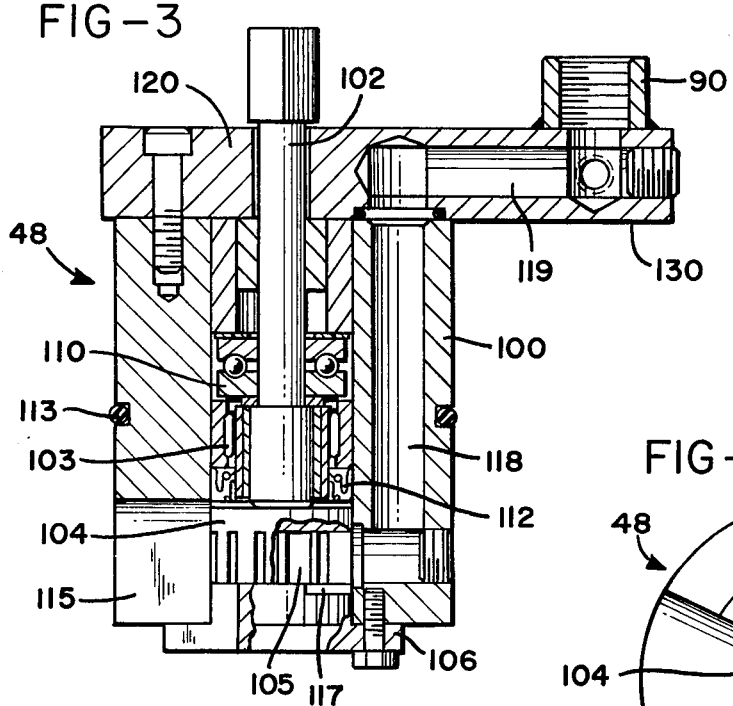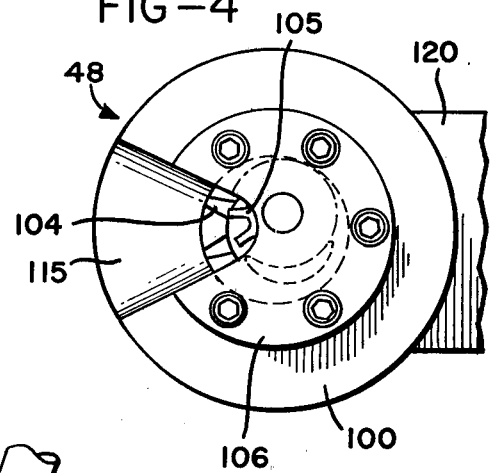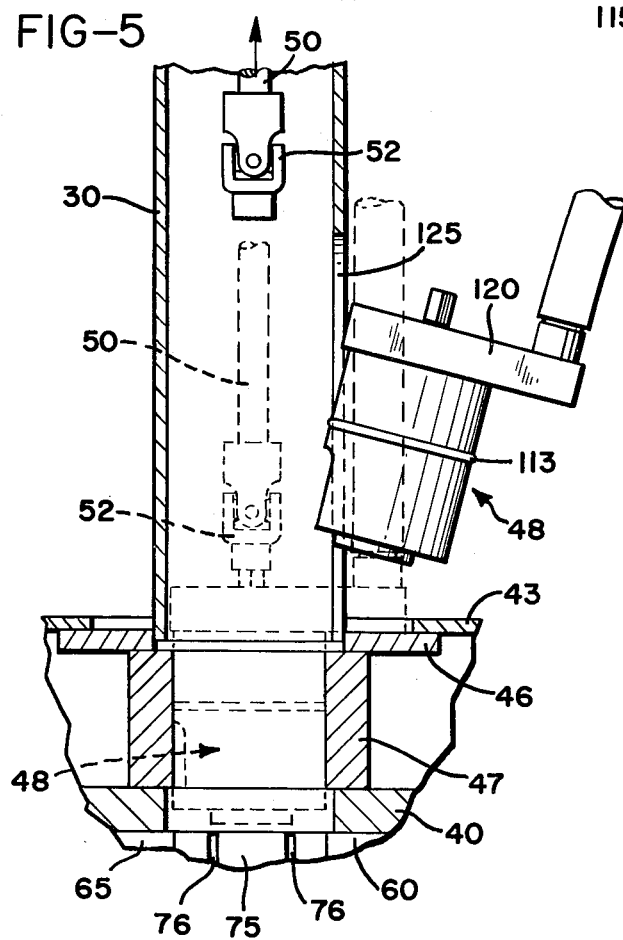

HOT MELT DISPENSER WITH REMOVEABLE PUMP IN FOLLOWER

BACKGROUND OF THE INVENTION

This invention relates to the art of plastic material pumping and dispensing apparatus, and pertains more particularly to improved pumping apparatus useful for handling hot melts, epoxy materials, adhesives and the like.

Hot melt and plastic material dispensers are known in the prior art which dispense plastic materials directly from the shipping container or barrel. Commonly, such devices include an arrangement for lowering a combined follower, heating element, and pump directly into the open end of the shipping container, for liquefying or melting the plastic material in the region directly below a heated platen, and for delivery by pump of the liquefied material to a remote location.

Commonly, such dispensing apparatus includes a follower plate or platen assembly which carries a seal about its periphery, which carries, supports or incorporates a pump, and which usually carries, supports or incorporates a heater or heated segment on the bottom thereof exposed directly to the plastic material within the container, for liquefying the plastic material, and for delivery of such plastic material to the inlet of the pump. Either a platform may be provided by means of which the container is elevated or a mechanism may be provided by means of which the plate assembly is lowered into the container.

Commonly, dispensing apparatus of the type described above is provided with either a rotary or a reciprocating pump which has an inlet positioned to receive material from a region underlying the platen for delivery to a remote position. For example, centrally positioned centrifugal type pumping apparatus in combination with hot melt dispensing apparatus is shown in Von Haase, U.S. Pat. No. 2,522,652 issued Sept. 19, 1950 and Hooker, U.S. Pat. No. 3,031,106 issued Apr. 24, 1962.

Skonberg, U.S. Pat. No. 3,282,469 issued Nov. 1, 1966 states that either reciprocating or rotary pumping apparatus may be used, but no specific pump construction is shown.

Weitzel, U.S. Pat. No. 3,113,705 issued Dec. 10, 1963, shows an airmotor driven pump of the type used for pumping lubricants, with a tubular pump body extending down through a cap plate into an axially offset receiving chamber.

SUMMARY OF THE INVENTION

The present invention is directed to the arrangement and construction of a cartridge-type gear pump particularly useful for the pumping and delivery of plastic or plastic-like viscous materials, including hot melts, epoxies, adhesives, and the like. In the preferred embodiment, the pump is shown and described in combination with the follower plate of a hot melt dispenser.

The cartridge pump has gears incorporated into a body forming, in effect, a generally cylindrical cartridge-like member which is sealably received within a surrounding supporting sleeve, centrally of the follower plate. The pump is characterized by ease of rapid installation and removal without the necessity for removing or tearing down the follower plate. This is particularly useful since in some instances it may be desired to change the volumetric output or pressure of the pump.

Further, it is known that some materials are quite abrasive, causing wear on the pump, and it may become necessary or desirable to remove the pump for rebuilding or replacment. This feature is provided for in this invention by the construction of the pump and of the follower plate which permits removal or replacement, without the necessity for withdrawing the plate from the barrel.

A positive displacement pump permits a selection of a volumetric output which is relatively independent of temperature and viscosity. Further, a constant output is assured at relatively high output pressures. A particular feature of the pump resides in the combination of a thrust bearing, permitting the pump to be operated at output pressures of 1500 psi or more while the follower plate is forcefully lowered into the container. Commonly, in the past, high pressure output has been provided by reciprocating pumps, but these pumps do not have a constant volumetric output or constant pressure output, which results in gaps if one is trying for example to lay a continuous bead on a surface.

A further advantage of the pump of this invention is that there is a minimal quantity of material contained without the pump itself. As a result, heat-up time is reduced compared to that of conventional reciprocating and centrifugal pumps. A further advantage of having a minimal quantity of material arises in the event that there is a change in the type of material being handled. It is difficult, in a common reciprocating pump, to displace a heaver viscosity material with a lighter material. However, in the case of a rotary pump it may be reversed to expel the material with minimum of waste.

It is accordingly an object of the invention to provide a dispenser incorporating a cartridge-type pump.

Another object of the invention is to provide a cartridge-type gear pump for dispensing flowable plastic-like material as hot melts, epoxies, adhesives and the like.

A still further object of the invention is the provision of a heated follower plate incorporating an axial, central gear pump formed in a cylindrical cartridge-like body which is removable through an access opening formed in a depending support tube.

A still further object of the invention is to provide a dispenser, as outlined above, incorporating a cartridge pump of the gear type having a thrust bearing for delivery of plastic material at high pressure.

These and other objects and advantages of the invention will be apparent from the following description, the accompanying drawings, and the appended claims.

BRIEF DESCRIPTION OF THE DRAWINGS

FIG. 1 is an elevational view of pumping and dispensing apparatus in accordance with this invention;

FIG. 2 is an enlarged vertical cross-section through the follower platen showing the pump in elevation;

FIG. 3 is a vertical section through the pump;

FIG. 4 is a bottom end view of the pump; and

FIG. 5 is a fragmentary vertical view of the support tube and a portion of the follower platen showing the manner in which the pump may be installed or removed from the platen.

DESCRIPTION OF THE PREFERRED EMBODIMENT

The preferred embodiment of this invention is described below in combination with a heated follower plate of the type described and claimed in our co-pending United States application Ser. No. 755,974 filed Dec. 30, 1976, and entitled HOT MELT DISPENSER, since the pumping apparatus of this invention has particular utility when used in combination with a heated platen, to deliver hot melt materials under pressure and at uniform flow rate. However, it is to be understood that the invention herein is not limited to its use within a heated platen. It may be used with advantage in follower plates in which no heat is needed, such as for the dispensing of liquid adhesives, epoxies and the like which are flowable at ambient temperatures. The pump itself is useful alone as a submerged pump to be lowered adjacent the bottom of a container, or to be incorporated into the bottom of a reservoir, without the use of a follower plate, for dispensing liquids which are flowable at ambient temperatures.

A hot melt dispensing apparatus incorporating a cartridge pump according to this invention is shown in FIG. 1 as including a base plate 10 on which is supported a plurality of uprights, including a pair of upright support cylinders 12 and 14. The base 10 supports a barrel 15 of hot melt material to be dispensed by the apparatus of this invention.

The cylinders 12 and 14 are supported at their upper ends at a transfer support 16. Also, a control box 20 may be supported on the base 10 and support 16 for including the electrical and temperature-monitoring controls of the dispensing apparatus.

A pair of cylinder rods 22 and 24 extend upwardly respectively from the cylinders 12 and 14. The rods are joined and connected at their tops by a crosshead 25. The crosshead 25 also supports a pump drive motor 26 and a right angle drive gear box 27.

The crosshead 25 further supports a depending tube 30. A follower platen or plate assembly indicated generally at 32 in FIG. 1 is carried by the tube 30, and is shown in the raised or elevated position prior to entering the barrel 15. Air under pressure may be admitted into the cylinders 12 and 14 to cause the rods 22 and 24 to extend and lift the crosshead 25 and the associated structure supported thereon to an elevated or raised position, as shown in FIG. 1. Similarly, air under pressure may be applied to the opposite ends of the cylinders 12 and 14 to cause the follower plate assembly 32 to be lowered into the barrel with a predetermined force or pressure against material in the barrel 15.

Referring to FIG. 2, the follower platen plate assembly 32 is shown as including an annular bottom plate 40 on which is mounted an outer cylindrical body 42, which supports a cover plate 43. The body 42 is formed with a pair of peripheral grooves which respectively support a pair of hollow elastomer seals 45. The seals 45 engage the inside walls of the barrel 15 and provide a fluid-tight seal therewith.

The support tube 30 is joined to the assembly 32 by an annular flange 46 and a centrally located, cylindrical pump supporting spacer 47. The spacer extends vertically between the flange 46 and the bottom plate 40 in axial alignment with a central opening 44 formed in the plate 40. The spacer 47 receives a gear-type positive displacement cartridge type pump 48 made according to this invention and described in further detail below. The pump 48 is directly driven by the motor 26 and the drive 27 through a drive shaft 50 within the tube 30, as coupled to the pump by a universal joint 52.

As described in the above-identified co-pending application, there may be on the lower surface of the plate 40 a plurality of essentially identical sector-shaped heater segments 60 as shown in FIGS. 3 and 4. Each heater segment 60 is formed with a curved outer peripheral wall 62, generally radially extending sides 64 and a truncated apex adjacent the plate opening 44. Each heater segment 60 is preferably formed of cast aluminum and incorporates a cast-in heating element 68 as shown in broken view in FIG. 2. The electrical terminals 69 extend upwardly through access openings 70 formed in the follower plate. Bolts 72 extend downwardly through the follower plate 40 into the body of the heater segments 60 for securing the segments in underlying relation to the bottom plate 40.

The individual heater segments 60 are arranged side-by-side in a circle on the plate 40, and define at their common apex a central pump inlet region 75 as shown in FIG. 2. Narrow radial flow passages 76 are defined between the adjacent walls 64 of the heater segments.

The lower heat conducting surfaces of the heater segments 60 may be formed with a plurality of integral heat conducting cylindrical or tapered projections 80. The tips 82 of the projections terminate at a common plane and are arranged in a regular grid or pattern, to define therebetween a multitude of flow passages. The pins or projections 80 precede the main bodies of the segments 60 and extend into the plastic material in advance to preheat and soften the plastic material for flow therebetween and flow through the radial passages 76 into the central inlet space 75 and from there into the inlet of the pump 48. The pump outlet opens into a fitting 90 to which a tube 92 (FIG. 1) is attached for delivery of the hot melt material to a remote location.

Reference may be had to FIGS. 3-5 for details of the pump 48 and the manner in which it may be inserted and withdrawn from the follower platen 32. As shown in FIG. 3, the pump is formed with a generally cylindrical hollow body 100 which rotatably receives the pump drive shaft 102 on needle bearings 103. A toothed outer pumping or drive gear 104 is carried on the end of the shaft 102. An internal idler pump gear 105 is positioned within the drive gear 104 in offset relation to the axis of the drive gear 104 as shown in FIG. 4, and is supported for rotation on a pump end cap 106. The drive end of the shaft 102 is enlarged with the bearing 103 and engages a thrust bearing 110 positioned above the needle bearing 103. An elastomer lip seal 112 is positioned in the body 100 inwardly of the gear 104 to seal the interior of the pump. The outer surface of the body is grooved to receive an O-ring seal 113.

The pump inlet 115 is designed as a wide sector-shaped opening formed in the side of the body 100 and in the corresponding underlying side of the end plate 106, and exposes at least two of the slots between the teeth of the outer rotary pump gear 104. In this manner a relatively wide and unobstructed pump inlet opening is formed for receiving the highly viscous material to be pumped. The pump outlet is ported through a relief 117 in the end cap 106, opening into a passageway 118, formed in the body and leading to a connecting passageway 119 formed in a pump support upper cap 120. The passageway 119 joins with the threaded pump outlet fitting 90 for connection to the conduit tube 92, as previously described.

As shown in FIG. 5, the platen support tube 30 is provided with a pump access opening 125 adjacent its lower end. The opening 125 is proportioned to receive the entire pump 48 therethrough for insertion and removal from within the cylindrical spacer 47. When the pump 48 is inserted with the spacer 47, the outer surface of the pump body 100 is sealed with respect to the spacer 47 by means of the O-ring 113.

In the event it becomes necessary or desirable to service the pump or replace the same, it is simply necessary to withdraw the drive shaft 50 upwardly as shown by the arrow in FIG. 5. A simple holddown clamp (not shown) retains the pump 48 with the lower offset surface 130 of the upper cap 120 in seated relation on the flange 46. With the clamp removed, the pump 48 is free to be lifted upwardly and outwardly through the access opening 125 without the necessity for disturbing the follower 32. It is thus possible to service the pump 48 even though the follower 32 is lowered within the container 15.

The thrust bearings 110 provide a gear pump which withstands the forces on the rotary parts, tending to lift the shaft 102 upwardly, by reason of the forced insertion of the follower 32 into a container, and by reason of the hydraulic forces which may be developed within the container and the pump 48. The wide sector-shaped inlet opening 115 formed in the body 100 of the pump extends vertically a distance which is at least equal to the vertical height of the pump drive gear 104, so that the full depth of the slots between the gear teeth are exposed to fluid at the inlet. Also, the corresponding notch formed in the cap 106 assures that the underlying inlet portions of the interfitted gears at the inlet region are also exposed to the material to be pumped. Thus, positive priming of the pump is assured even where the pump assembly is used for the pumping of viscous semi-liquid products at ambient temperature which are otherwise difficult to pump.

The pump of this invention need not be employed on a heated or sealed follower plate assembly of the type shown in FIGS. 1 and 2. Thus, in some instances, it may not be necessary to provide heaters, nor may it be necessary to provide the peripheral seals 45. Further, the pump itself may be used alone without the usual follower plate arrangement and thus, may be used as a submerged pump within a container of liquid material, such as an epoxy, or an adhesive, or room temperature vulcanizing rubbers. Additionally, the pump 48 may be inserted into the bottom of a liquid reservoir for delivery of the liquid under metered conditions to a remote location.

While the form of apparatus herein described constitutes a preferred embodiment of this invention, it is to be understood that the invention is not limited to this precise form of apparatus, and that changes may be made therein without departing from the scope of the invention.

What is claimed is:

1. In pumping and dispensing apparatus, in which a platen carrying a pump and a plastic material heater is lowered by a vertical central support into a barrel of hot melt material for melting and dispensing the same from the barrel, the improvement in platen construction, comprising a plurality of sector-shaped heater segments arranged in a circle on the bottom of said platen and defining at a common apex a pump inlet opening, a cylindrical pump support spacer member positioned centrally of said platen and in generally axial alignment with said platen support, a cartridge-type gear pump having a generally cylindrical body sealably received within said member and having an inlet opening at said common apex and having an outlet, means in said platen support defining a pump access opening positioned above said platen and proportioned to receive said pump, said pump being insertable into said member by movement thereof through said opening thereby providing for changing of said pump without othterwise disturbing said platen.

2. The apparatus of claim 1 in which radial passages are defined between adjacent heater segments leading to said pump inlet.

3. In pumping and dispensing apparatus, in which a platen carrying a pump is lowered into a barrel of hot melt material for melting and dispensing the same from the barrel, the improvement comprising a tubular platen support, a platen carried on said support for movement within a container of liquid to be pumped, a pump support member positioned centrally of said platen and in generally axial alignment of said tubular platen support, means in said pump support defining a cylindrical opening, a cartridge type gear pump having a generally cylindrical body sealably received within said cylindrical opening and having an inlet on the bottom of said pump and having an outlet, means in said platen support defining a pump access opening positioned above said platen and proportioned to receive said pump, said pump being insertable into said pump support cylindrical opening by movement thereof through said access opening thereby providing for changing of said pump without otherwise disturbing said platen.

4. In a dispenser having a follower plate carried on a support tube, the improvement comprising means in said plate defining a pump receiving housing in generally axially alignment with said support tube, a cartridge-type gear pump having a cylindrical body received in said housing, means sealing said pump body at said housing, means in a lower end of said body defining a pump inlet to receive material to be dispensed, said pump being removable from said plate pump housing by sliding upwardly from said housing and through said support tube without otherwise disturbing said plate.

5. The dispenser of claim 4 further comprising means for lowering said plate into a container, and thrust bearing means in said pump for carrying axial pressure applied to the gears thereof.

6. The dispenser of claim 4 further comprising pump inlet means formed as a generally V-shaped notch defined in said body, said notch extending vertically at least coextensive with the vertical height of the pump gears 7. The dispenser of claim 6 in which said notch is formed with a width sufficient to intercept two gear teeth.

* * * * *